Dec. 25, 1956   F. O. BEEBOUT   2,775,044
ANGLE INDICATOR
Filed Dec. 19, 1955
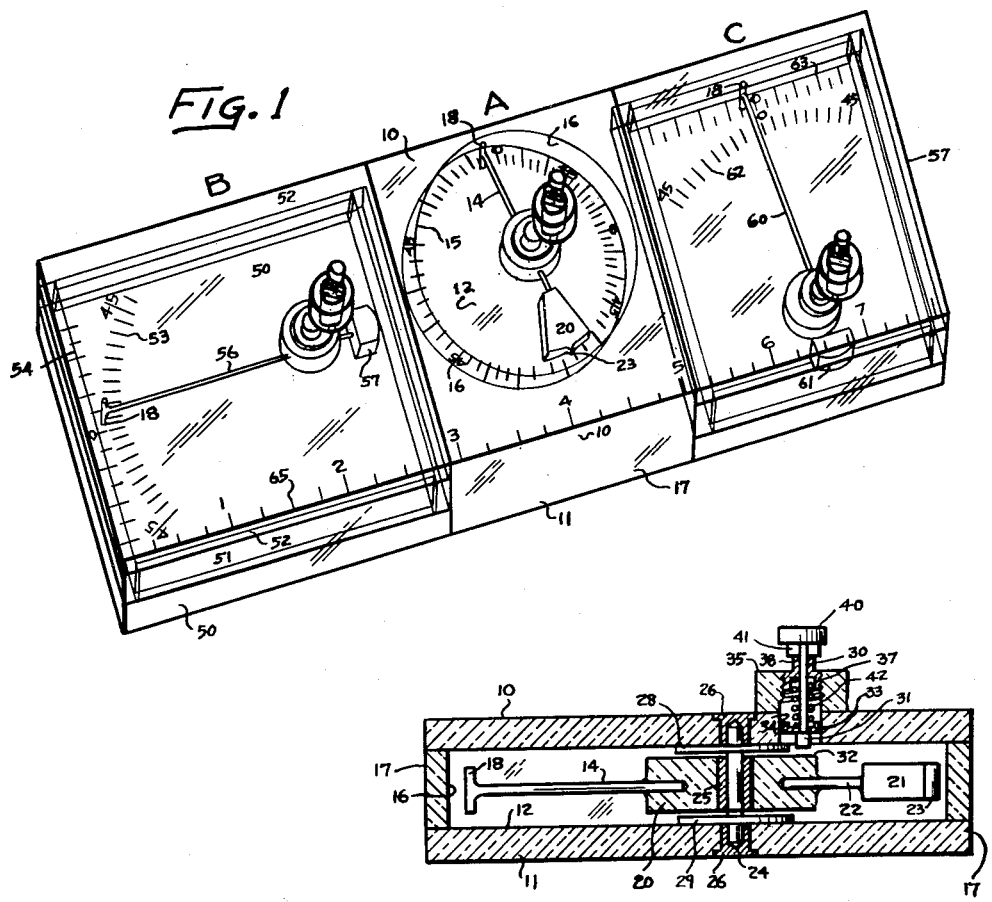
INVENTOR.
FOREST O. BEEBOUT
BY
Clayton L. Jenks
Attorney

United States Patent Office 2,775,044
Patented Dec. 25, 1956

2,775,044

ANGLE INDICATOR

Forest O. Beebout, Trinidad, Colo.

Application December 19, 1955, Serial No. 553,846

2 Claims. (Cl. 33—221)

This invention relates to a level or an angle indicating device, and more particularly to a level which will serve for indicating and temporarily registering an angle variation of any plane from a vertical line.

A carpenter or other artisan often requires to know both whether a plane is vertical or horizontal and what is the angle of variation therefrom. Moreover, he may need to maintain a temporary record of one or more previously measured angles while making a further measurement or a determination of whether a plane is vertical or horizontal. He may also require to make such a measurement either in degrees or as a variation indicated in fractional parts of an inch. Such a device should be waterproof and capable of use under various adverse conditions, and one should be able to observe the reading of the instrument from various positions, and particularly both front and rear.

One object of this invention is to provide a device capable of satisfying the above requirements, and to provide a single unit which will indicate the angular variations of a surface from both vertical and horizontal planes and to measure an angle in any one of the four quadrants relative to any of four perpendicularly arranged side faces of the device.

A further object is to provide an angle indicating level in which a swinging needle or pendulum may be releasably locked in an indicating position so as to maintain a temporary record of the angularity variation.

Another object is to provide a construction involving the use of a swinging pendulum type of pointer which is so mounted and enclosed in a transparent protective casing that it may be observed from both sides and ends of the device.

A still further object is to combine in a single unit a set of two pendulum pointers which may be separately used to indicate variations from vertical and horizontal planes and wherein the pointer readings may be temporarily registered for subsequent use while a third pointer serves in further uses. Other objects will be apparent in the following disclosure.

Referring to the drawings illustrating one embodiment of this invention:

Fig. 1 is a perspective view of a triple indicating instrument of parallelepipedon shape arranged for registering the angle of a surface relative to both a vertical and a horizontal plane as well as for indicating an angle in any quadrant which a surface makes relative to one of various sides of the instrument;

Fig. 2 is a sectional view taken through both the pivot axis and the locking device of a unit; and Fig. 3 is a detail in perspective of the outer members of the pointer locking device.

The triple unit indicating device illustrated in the drawings is formed of three hollow bodies A, B and C made preferably of a transparent plastic material, such as polyvinyl chloride or acetate, which are suitably cemented together at their junction faces or made as an integral body to form a narrow parallelepipedon shape as indicated. The central unit A, as shown in Fig. 1, may be formed of two plastic plates 10 and 11. The side plate 10 is substantially a flat plate, while the other plate 11 is hollowed out to form a cylindrical recess 12 within which the weighted or pendulum pointer 14 is mounted to swing under the influence of gravity. The unit may be made also as shown in Fig. 2.

The pointer swings relative to a circular or arcuate scale 15 which is suitably marked on the inner face of one of the parts, such as in reverse on the inner face of the cylindrical recess 12 so that the numbers show correctly from the outside. If desired, a scale may be placed on the opposed parallel faces of that cylindrical recess so that the scale may be easily read from either side of the transparent body of the level. The inner peripheral face 16 of that recess may also be marked, so that the position of the end pointer may be seen through the narrow bottom and top walls of the device when stood on either of its long narrow edge faces 17. The scale 15 of unit A may be divided into 90° quadrants relative to horizontal and vertical lines through the pivot axis so that the position of the needle 14 may be read relative to each of the four quadrants. The pivoted needle 14 may have an end cross bar 18 arranged at right angles to the shank of the needle and close enough to the scales on the faces of the cylindrical space to facilitate reading the pointer position through the end face 17 as well as the side plates 10 and 11. The needle may be made of non-metallic or non-magnetic material, if desired.

The pivot needle of each of the units is suitably mounted for swinging over the associated scale. As shown in Fig. 2, each needle or pointer 14 is a straight wire or rod suitably secured within a peripheral hole in a cylindrical plastic disc or plate 20, and it may be counter-balanced by a heavier weight 21 mounted on the end of a pin 22 which likewise fits tightly within a hole in the disc 20. That weight 21 may also be shaped to provide a short pointer 23, centrally located so that the position of the needle may be read from the weight end.

The pivot disc 20 is suitably mounted on a bearing axle or pin 24 as by means of a brass bushing 25 suitably embedded axially within the disc. The pin 24 may rotatably bear within that bushing 25 or it may fit snugly therein, in which latter case the pin 24 will have its bearings at its outer ends. The outer ends of the pin 24 are shown as extending outwardly into bushings 26 (Fig. 2) located in the two parallel plates 10 and 11. The pins 24 may have substantially pointed ends and the bushings 26 shaped correspondingly so as to give an almost needle point bearing. If the needle bushing 25 rotates on the pin 24, then the pin ends may be fixed in the bushings 26, as shown. Various other pivot constructions may be employed for the purpose. In the form shown, two brass discs 28, 29 may be located between the revolvable disc 20 and the inner sides of the plates 10 and 11 within the recess 12 so as to minimize frictional drag of the plastic material on the disc 20. It will be understood that the weight 20 is sufficiently heavy to insure that when permitted to move, it will swing the needle 14 readily into a vertical position relative to its pivot axis.

One feature of the invention involves releasably locking the needle in such position as it may have assumed for measuring an angle or indicating a variation from a horizontal or a plumb condition, as well as for locking the needle against swinging when it is not to be used. A preferred construction, as illustrated in Fig. 2, comprises a vertically slidable pin 30 so mounted that its enlarged inner end 31 may engage a side face 32 of the disc or plate 20 and be resiliently pressed thereagainst with sufficient force to prevent rotation of the disc. Immediately above the enlarged braking member 31 is a circular recessed washer 33 which is slidably mounted within a cylindrical recess 34 within the side plate 10 and a disc shaped continuation 35 of that plate. Press fitted or threaded into the recess 34 of the plate 35 is a hollow or cap shaped body 37 having a hole therethrough which forms a slidable support for the upper end of the pin 30. That body 37 has an upstanding centrally located narrow lug 38 providing parallel locking faces on opposite sides thereof. The outer end of the pin 30 carries a cylindrical thumb button 40 secured thereto, and that button has a downwardly extending lug 41 located off center or at one side thereof which has a lower flat face adapted to rest on the top flat face of the lug 38, as shown in Fig. 3.

If the button 40 is rotated in either direction, the lug 41, suitably dimensioned for the purpose, will slip into position where it lies at one side of the lug 38. A helical compression spring 42 located in the recess 34 between the disc 33 and the inner cylindrical recess of the member 37 urges the disc 33 inwardly and so tends to pull the lug 41 into a lower position relative to the lug 38, and thereby force the brake member 31 into engagement with the side face 32 of the swinging pivot disc 20. The button 40 may be manually rotated in either direction to allow the lug 41 to fall into the lower position relative to the lug 38 and thus set the brake, or by lifting it against the action of the spring and turning the button 40 through a quarter turn, the lug 41 may be located on top of the lug 38, Fig. 3, to hold the brake out of engagement with the plate 20 and allow the pointer to swing freely under the action of gravity on the weight 21. It will be appreciated that if the side disc 10 is made thick enough to enclose the spring 42, then the disc 35 may be omitted.

The central unit A has its pointer centrally mounted for swinging through 360°. The pointer may be observed from both sides of the transparent casing as well as somewhat through the side edge walls 17 where the marks on the surface 16 relative to the transverse pointer bar 18 may be observed. That construction will serve for indicating both plumb and level conditions. However, for various purposes, it is desirable to have separate level and plumb units which may be used in cooperation with the unit A to register several different angles at the same time. To this end, I have provided the units B and C secured integrally with the central unit A, which have larger pointers and scales adapted to give a more delicate measurement of angles relative to vertical and horizontal lines.

The unit B may be made of three wall sections 50, 51, 52 as shown in Fig. 1. The parts 50 and 52 are substantially flat plates spaced apart by the hollow rectangular framework 51. The lower plate 50 or the upper plate 52 or both may have an arcuate scale 53 located thereon to indicate degrees of measurement. Outside of that scale is a linear inch measuring scale 54 arranged close to the thin end wall of the central member 51. In the hollow rectangular compartment formed in the part 51 between the outer plates 50 and 52, the pointer 56, with its counter-balance 57 made and mounted as above described, has its pivot located off center near the inner wall adjacent unit A and remote from the scale 53 so that the pointer 56 may be as long as possible and the scale enlarged accordingly. The scale in that compartment is preferably marked to indicate 45° of measurement on each side of a zero center point. This pointer and its scale are primarily employed to determine plumb, in which case the entire unit is stood on its right hand end 57 which makes a right angle with the front edge face 17 of the device.

The unit C at the opposite end from the plumb determining pointer 56 comprises a further pointer construction for use in determining the angle of a surface relative to a horizontal plane when the device is stood on the long edge face 17. In this construction, the pointer 60 and weight 61 are normally at right angles to pointer 56. The pivot is mounted off center as near as possible to the edge face 17 so that the long pointer may swing across the 45° scale 62 as well as to move with reference to an inch scale 63 shown on the inner face of the plate 50, corresponding with the unit B. Each of these pointers 56 and 60 is preferably equipped with a horizontal end bar 18 as above described. Also, they have locking mechanisms made as above described. Hence, the pointer 56 indicates a plumb measurement and the needle 60 serves like a spirit level but further indicates the angle of variation from the horizontal. Thus the user may measure with unit B a variation from a vertical line and with unit C a variation from a horizontal line. The central unit A may be employed for making a still further measurement where a memory of the other angles needs to be carried for a time. This is particularly advantageous when a person is working on a building having sections of roof pitched at different degrees or where a road grade is to be indicated. The longer hands 56 and 60 make a finer measurement than does the central short hand 14 and their indications can be easily read at a distance. Also, a scale 65 suitably marked on one or more of the edges of the entire unit may be employed to give inch markings which will aid the user in making linear or geometrical measurements. The inch scales 54 and 63 make it possible for one to determine measurements of inclination in inches as well as in angle degrees of the arcuate scales.

It will now be appreciated that I have provided an angle indicating device in which a body has a weighted swingable pointer to indicate a vertical plane and a lock associated therewith which serves to set the pointer in a position which indicates a measurement relative to a base of the body. The body is preferably shaped as a parallelepipedon having two bases at right angles to each other so that the body may be stood on an end or a long side. The body is hollow and preferably sealed to prevent access of moisture and dirt, and the weighted pointers are mounted within the hollow. These pointers which are weighted to swing like a pendulum are visible through at least one transparent wall, and the body is preferably made wholly of the transparent material so that the pointers may be readily observed from many positions. The scales which are either arcuate for measuring angles or linear for other geometric measurements are so arranged relative to the mounts of the pointers that the latter may swing freely over the scales and make the required indications of angularity of a base relative to a horizontal surface. In measuring plumb the vertical surface is, of course, referred to a horizontal surface towards which the weighted end of the pointer gravitates.

The lock for the pointer comprises a stop or a friction part which is releasably engageable with the pointer, including any part which is directly movable therewith, such as the plastic plate 20. This lock is manually controlled preferably by a stem carrying the friction member 31 which projects through the casing wall and has a manually engageable part thereon. A spring is preferably arranged to urge the friction part or stop into a locking engagement with the pointer. The manual control includes a clutch type of member which may be moved either to permit such engagement or to hold the lock away from the pointer.

The preferred construction comprises two pointers which indicate measurements at right angles to each other relative to a given base, so that the device may operate as a level and as an instrument for determining plumb. It is also desirable to have the third instrument of the center portion A in which the pointer swings freely through all four quadrants of the circle, so that any type of measurement may be made and retained by this mechanical memory system while either of the other pointers retains a given measurement.

The operation and the utility of this device will be apparent to one skilled in the art. Also, it will be appreciated that various modifications may be made in the construction as well as in the types of materials and arrangements and mountings of the pointer units and their locks. Hence, the above description is to be interpreted as setting forth the principles of this invention and a preferred embodiment and not as imposing limitations on the appended claims.

I claim:

1. An angle indicating device comprising a sealed, hollow body of transparent material having four edge faces forming bases at right angles and separated side walls perpendicular to the bases which provide substantially unobstructed space therebetween for pointer movement and observation, a set of three weighted pointers, pivotal mounts carried by the side walls which provide for the pointers swinging freely, two of the mounts being so located off center that their pointers may swing through 90° and the third pointer being centrally mounted for rotation through 360°, scale markings corresponding with the pointer movements located on the inside of the hollow body which are visible through both side walls, each pointer being shaped at its end to move close to its associated scale, a plate fixed to move with each pointer, three slidably and pivotally mounted shafts, each having a stop at one end releasably engageable respectively with one of the plates and an outer end projecting through a body wall for manual manipulation, a spring urging each stop into engagement with the plate, and means associated with each shaft for releasably holding its stop out of engagement with the associated plate which provides for movement of the stop to lock the pointer from swinging while at any indicating angle, said off center pointers and their scales serving to indicate angles relative to two perpendicular bases and the third pointer and its 360° scale serving to measure an angle relative to any base.

2. An angle indicating device comprising a sealed hollow body having side walls and a base, a weighted pointer, an axle supporting the pointer, pivotal bearings therefor mounted on the side walls, scale markings cooperating with the pointer to indicate an angle of inclination of the base relative to the pointer, a plate mounted to swing with the pointer, an axially slidable and rotatable shaft projecting outwardly through a body wall which has a stop releasably engageable with the plate, cooperating lugs on the shaft and the body wall which are positioned to hold the stop away from the plate and are relatively rotatable to permit inward movement of the shaft to engage the stop with the plate, and a spring which urges the shaft inwardly to cause said engagement and hold the pointer in any angle indicating position.

References Cited in the file of this patent

UNITED STATES PATENTS

| 169,927 | Starr | Nov. 16, 1875 |
| 2,596,422 | Miller | May 13, 1952 |
| 2,632,958 | De Masters | Mar. 31, 1953 |

FOREIGN PATENTS

| 5,588 of 1913 | Great Britain | Aug. 21, 1913 |